3,140,944
METHOD OF SINTERING TUNGSTEN
Leonard L. France, Pittsburgh, and Robert L. Ammon, Baldwin Borough, Pa., assignors to Westinghouse Electric Corporation, East Pittsburgh, Pa., a corporation of Pennsylvania
Filed June 21, 1962, Ser. No. 204,274
4 Claims. (Cl. 75—200)

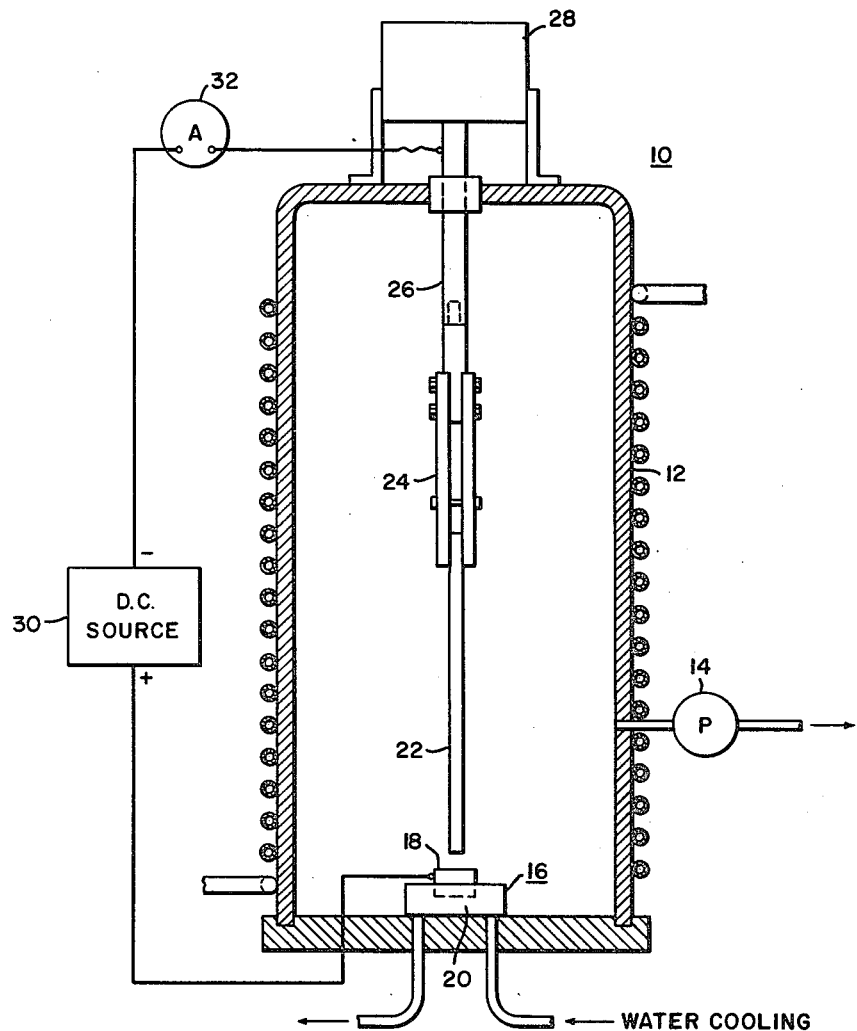

This invention relates to sintering of tungsten and, more particularly, to an improved method for rapidly sintering tungsten.

Tungsten is normally prepared in accordance with conventional powder metallurgy techniques wherein the ore is first reduced to powdered tungsten. Thereafter the powdered tungsten is compressed under very high pressures to form a so-called compact which is self-sustaining in that it will retain its configuration if not subjected to any appreciable stresses. This compact is then presintered by heating in a non-oxidizing atmosphere, preferably hydrogen, at a temperature of about 1000° C. for about thirty minutes, in order to provide the compact with some degree of insipient sintering to improve its strength.

The presintered compact is placed into a sintering bottle in a vertical position. The upper end of the compact is clamped in a heavy electrical contact and the lower end of the compact is affixed to an electrical contact which is placed in a mercury pool. A non-oxidizing atmosphere, preferably hydrogen, is introduced into the sintering bottle and a heavy current is passed through the compact. This current is normally governed by the so-called fusion current of the compact, which is that current required to generate sufficient resistance heating in the tungsten to cause it to melt. A representative sintering current is approximately eighty-five percent of the current required to melt the tungsten compact being sintered, and this current is maintained at its maximum value for approximately fifteen to thirty minutes. This sintering causes the compact to densify to eliminate substantially all porosity contained therein, and the tungsten particles coalesce during sintering to form a unitary mass.

The foregoing sintering procedure is time-consuming. In addition, both ends of the compact which were surrounded by the electrical contact adaptors are insufficiently sintered, and must be broken off and otherwise utilized or discarded. Further, when the compact is sintered in such a bottle, the sintered compact is frequently warped or otherwise distorted.

It is the general object of this invention to provide an improved method for sintering a tungsten compact in a rapid fashion.

It is another object to provide an improved method for sintering tungsten wherein only one end of the sintered compact need be discarded.

It is a further object to provide an improved method for sintering a tungsten compact wherein the fully sintered compact is substantially straight and is not subject to warping or other distortion.

The aforesaid objects of the invention, and other objects which will become apparent as the description proceeds, are achieved by providing a method for rapidly sintering a self-sustaining tungsten compact which has a substantial degree of porosity, in order to convert the porous compact into a unitary mass which has substantially no porosity. In practicing this method, the self-sustaining compact, which is preferably presintered, is secured at one end in a substantially vertical position with the other end of the compact free and positioned below the secured end. The free end of the compact is placed proximate to a refractory anode pad and the contact and pad maintained under non-oxidizing conditions, with a dynamic vacuum preferred. A predetermined D.C. potential is applied between the secured end of the compact and the pad and an electric arc is initiated between the free end of the compact and the pad. The polarity is such that the pad serves as the anode of the formed arc and the free end of the compact serves as the cathode of the formed arc. A predetermined electric current is maintained through the arc in order to heat the arc-current-carrying portion of the compact to a temperature which approaches but which does not reach the melting point of tungsten, and this current is maintained for a predetermined period of time. This treatment sinters the compact into a unitary mass in very rapid fashion, with the resulting sintered compact having substantially no porosity. Thereafter the arc is discontinued and the sintered compact at least partially cooled while maintained under the non-oxidizing conditions.

For a better understanding of the invention, reference should be had to the accompanying drawing, wherein the sole figure illustrates in diagrammatic form a vacuum arc furnace which has been modified in order to sinter tungsten in accordance with the present invention.

With specific reference to the sole figure of the drawing, the furnace 10 has a surrounding, water cooled, metal jacket 12 which is adapted to be evacuated by means of a conventional pump 14. The anode pad 16 is positioned in the bottom portion of the furnace and comprises a tungsten pad portion 18 which is surrounded by a water-cooled copper jacket 20. Such an anode construction is conventional for consumable electrode, vacuum arc furnaces. The compact which is to be sintered is suspended from its upper end by a conventional retaining contact sleeve 24, which is attached to an electrically conducting connecting rod 26. The rod 26 is hermetically sealed through the jacket 12 and is adapted to be moved up and down by a conventional advancing and retracting mechanism 28, in order to vary the spacing between the free end of the compact 22 and the tungsten pad 18. A conventional variable output D.C. supply source 30 connects between the anode pad 18 and the connecting rod 26, with the anode pad maintained positive. An ammeter 32 is connected in the line.

As a specific example, the tungsten compact is first pressed into self-sustaining form and presintered by heating in a hydrogen atmosphere to a temperature of 1000° C. for a period of thirty minutes. The presintered compact has dimensions of three-quarters inch by three-quarters inch by twenty inches. The presintering will provide some degree of insipient sintering, although the compact will have a density of only about 57% of the density of tungsten. The self-sustaining compact is secured at one end in a substantially vertical position, as shown in FIG. 1. The furnace is evacuated and an arc initiated between the free end of the compact 22 and the tungsten pad 18, such as by applying a potential between the secured end of the tungsten compact 22 and the tungsten pad 18, and moving the free end of the compact 22 toward the pad 18 until the arc is initiated. When the arc is initiated, the compact 22 is retracted slightly by means of the retracting mechanism 28 and a current of 4000 amperes is maintained through the compact 22 for a period of from two to three minutes.

At the end of the three minute period, the density will be approximately 95% of the density of tungsten, so that substantially all voids which originally existed in the tungsten compact will have been eliminated. At the end of two minutes, the density of the tungsten compact will be approximately 89% of the maximum possible density, that is, the true density of tungsten.

The present method provides a very uniform heating of the compact, and if the preferred dynamic vacuum is used, a minimum of heat is lost from the compact during the sintering. Also, it is possible to approach very closely the fusion temperature of the compact without actually achieving this fusion temperature. This combination of factors enables the sintering to be conducted in a very rapid fashion.

Apparently because of the fact that one end of the compact hangs free and electrical connection thereto is maintained through the medium of the arc, there will be substantially no warpage or other distortion of the formed tungsten ingot. In addition, since only one end of the compact is connected to an electrical contact during the sintering process, only one end of the ingot need be broken off after sintering. As a result, the present process is not only considerably faster than the prior sintering processes, but is also improved both with respect to quality and quantity of the finished product in that the ingot is not warped and less tungsten is discarded.

The current sintering schedule is subject to considerable variation. As an example the arc and thus the current can be applied in an interrupted rather than continuous fashion. For the foregoing specific compact, the arc can be struck and a current of 3000 amperes maintained for 45 seconds, after which the arc is extinguished. Thereafter, the arc can be restruck and the current maintained at 4000 amperes for 15 seconds, after which the arc is extinguished. The arc can then be restruck and the current maintained at 4000 amperes for one minute.

After sintering, the compact is preferably maintained under the vacuum conditions until it is at least partially cooled. Thereafter the ingot is swaged and drawn to wire of the desired size, in the case of tungsten filaments, or rolled or worked to the desired configuration to form other tungsten members.

The sintering is preferably conducted under dynamic vacuum conditions maintained at a pressure of 20 microns of mercury or less, for example. It should be understood, however, that non-oxidizing atmospheres can be substituted for the vacuum, if desired. In addition, while a specific example has been carried through in detail for a specific size of compact, varying the overall dimensions of the compact will necessarily vary the sintering currents required.

It will be recognized that the objects of the invention have been achieved by providing an improved method for sintering a self-sustaining compact, which method is rapid, introduces substantially no warping or distortion into the sintered ingot and, in addition, is more economical in that only one end portion of the sintered ingot need be discarded.

While a best embodiment of the invention has been illustrated and described in detail, it is to be particularly understood that the invention is not limited thereto or thereby.

We claim as our invention:

1. The method of rapidly sintering an elongated self-sustaining tungsten compact which has a substantial degree of porosity to convert the porous compact into a unitary mass which has substantially no porosity, which method comprises: securing said porous compact at one end and in a substantially vertical position with the other end of said compact free and below the secured end of said compact; positioning the free end of said compact proximate to a refractory anode pad, and maintaining said compact and said pad under non-oxidizing conditions; applying a predetermined D.C. potential between the secured end of said compact and said pad to form an electric arc between the free end of said compact and said pad, with said pad maintained as the anode of the formed arc and the free end of said compact maintained as the cathode of the formed arc; maintaining through the formed arc for a predetermined period of time a predetermined electric current which is sufficient to heat the arc-current-carrying portion of said compact to a temperature which approaches but does not reach the melting point of tungsten in order to sinter said compact into a unitary mass having substantially no porosity; and discontinuing the arc and at least partially cooling the sintered compact while maintaining the sintered compact under the non-oxidizing conditions.

2. The method as specified in claim 1, wherein said compact is maintained under dynamic vacuum conditions during sintering and cooling.

3. The method of rapidly sintering an elongated self-sustaining presintered tungsten compact which has a substantial degree of porosity to convert the porous compact into a unitary mass which has substantially no porosity, which method comprises: securing said porous compact at one end and in a substantially vertical position with the other end of said compact free and below the secured end of said compact; positioning the free end of said compact proximate to and above a refractory anode pad, and maintaining said compact and said pad under dynamic vacuum conditions; applying a predetermined D.C. potential between the secured end of said compact and said pad to form an electric arc between the free end of said compact and said pad, with said pad maintained as the anode of the formed arc and the free end of said compact maintained as the cathode of the formed arc; maintaining through the formed arc for a predetermined period of time a predetermined electric current which is sufficient to heat the arc-current-carrying portion of said compact to a temperature which approaches but does not reach the melting point of tungsten in order to sinter said compact into a unitary mass having substantially no porosity; and discontinuing the arc and at least partially cooling the sintered compact while maintaining the sintered compact under the dynamic vacuum conditions.

4. The method of rapidly sintering an elongated self-sustaining presintered tungsten compact having dimensions of ¾" x ¾" x 20" and which has a substantial degree of porosity to convert the porous compact into a unitary mass which has substantially no porosity, which method comprises: securing said porous compact at one end and in a substantially vertical position with the other end of said compact free and below the secured end of said compact; positioning the free end of said compact proximate to and above a refractory anode pad, and maintaining said compact and said pad under dynamic vacuum conditions; applying a predetermined D.C. potential between the secured end of said compact and said pad to form an electric arc between the free end of said compact and said pad, with said pad maintained as the anode of the formed arc and the free end of said compact maintained as the cathode of the formed arc; maintaining through the formed arc for at least about two minutes an electric current of about 4000 amperes in order to sinter said compact into a unitary mass having substantially no porosity; and discontinuing the arc and at least partially cooling the sintered compact while maintaining the sintered compact under the dynamic vacuum conditions.

References Cited in the file of this patent
UNITED STATES PATENTS

| | | |
|---|---|---|
| 2,686,822 | Evans et al. | Aug. 17, 1954 |
| 2,907,806 | Rossin et al. | Oct. 6, 1959 |
| 2,982,844 | Ham | May 2, 1961 |